United States Patent
Shipp

(10) Patent No.: US 7,877,807 B2
(45) Date of Patent: Jan. 25, 2011

(54) METHOD OF AND SYSTEM FOR, PROCESSING EMAIL

(75) Inventor: Alexander Shipp, Cirencester (GB)

(73) Assignee: Symantec Corporation, Mountain View, CA (US)

( * ) Notice: Subject to any disclaimer, the term of this patent is extended or adjusted under 35 U.S.C. 154(b) by 997 days.

(21) Appl. No.: 10/332,552

(22) PCT Filed: Jul. 6, 2001

(86) PCT No.: PCT/GB01/03036

§ 371 (c)(1),
(2), (4) Date: Sep. 22, 2003

(87) PCT Pub. No.: WO02/05072

PCT Pub. Date: Jan. 17, 2002

(65) Prior Publication Data

US 2004/0054498 A1     Mar. 18, 2004

(30) Foreign Application Priority Data

Jul. 7, 2000    (GB) ................... 0016835.1

(51) Int. Cl.
   *G08B 23/00*   (2006.01)
   *G06F 12/14*   (2006.01)
(52) U.S. Cl. .......................... 726/24; 726/22
(58) Field of Classification Search ............ 726/24, 726/22
   See application file for complete search history.

(56) References Cited

U.S. PATENT DOCUMENTS

| | | | |
|---|---|---|---|
| 5,414,833 A | | 5/1995 | Hershey et al. ............. 395/575 |
| 5,796,942 A | * | 8/1998 | Esbensen ..................... 726/13 |
| 5,832,208 A | * | 11/1998 | Chen et al. .................... 726/24 |
| 5,889,943 A | * | 3/1999 | Ji et al. ........................ 726/22 |
| 5,935,245 A | * | 8/1999 | Sherer ........................ 726/13 |
| 5,960,170 A | * | 9/1999 | Chen et al. ................... 714/38 |
| 6,253,337 B1 | * | 6/2001 | Maloney et al. .............. 714/38 |
| 6,421,709 B1 | * | 7/2002 | McCormick et al. ........ 709/206 |
| 6,453,327 B1 | * | 9/2002 | Nielsen ...................... 715/500 |
| 6,519,703 B1 | * | 2/2003 | Joyce .......................... 726/22 |
| 6,701,440 B1 | * | 3/2004 | Kim et al. .................... 726/24 |

(Continued)

FOREIGN PATENT DOCUMENTS

WO    WO 93/22723    11/1993

(Continued)

OTHER PUBLICATIONS

Garber, Lee; Melissa Virus Creates a New Type of Threat.

(Continued)

*Primary Examiner*—Kambiz Zand
*Assistant Examiner*—William S Powers
(74) *Attorney, Agent, or Firm*—Gunnison, McKay & Hodgson, L.L.P.; Philip McKay

(57) ABSTRACT

A system for processing emails incorporates means for dealing with previously unknown viruses. The system monitors email traffic patterns to identify patterns characteristic of a virus outbreak and takes corrective action when an outbreak is detected. Individual emails are analysed and, if any one of the constituent parts contains content in which it is possible to contain a virus, characteristic data derived from the email is logged to a database which is scanned for outbreak-indicating traffic patterns.

22 Claims, 2 Drawing Sheets

U.S. PATENT DOCUMENTS 6,886,099 B1     4/2005     Smithson et al.
7,072,942 B1 *    7/2006     Maller ........................ 709/206

FOREIGN PATENT DOCUMENTS

WO     WO 00/05650     2/2000
WO     WO/00 05852     2/2000

OTHER PUBLICATIONS

Howlett, Dennis; Screening your e-mail contents.
McAfee; Outbreak Manager.
Howlett, Dennis; Screening your e-mail contents; Product Information No. 105; E-Mail Protection Tools; Mimesweeper New Product Information.
McAfee, The Vacine for E-Business; Outbreak Manager; 2000, Network Associates and its affiliated Companies.
Garber, Lee; Technology New; "Melissa Virus Creates a New Type of Threat"; Computer New, Jun. 1999.
Qasem & Yaghi, "AI trends in virus control", 1991, IEEE, XP10044955.
groups.google.decomp.security.unix "3 free tools to combat the Melissa email virus", from website: http://groups.google.de/group/comp.security.unix/browse_thread/thread/4b8c4d5e004e6c71/8b37e0c7c2187f33?q=Melissa&rnum=1 &hl=de#8b37e0c7c2187f3.
AVD Beta Coordinator; "GroupShield Domino v 5 Beta 1 now available"; GroupShield Domino Announcement, Google Beta Groups comp.groupware.lotus-notes. misc.
Groupshield Exchange Administrator's Guide, undated archive document, pp. 205-231.
Groupshield Release Notes; 2003.
McAfee "Outbreak Detection and Management"; internet archive; website: http://www.mcafee.com/us/_tier2/products/_media/mcafee/wp_outbreak_detection.pdf.
Network Associates, Inc.; "McAfee Active Virus Defense Delivers First Proactive Internet Protection Designed to Stop Virus Outbreaks Before They Start", Feb. 23, 2000, Hannover, Germany CeBIT, PRNewswire http://www.mcafee.com/us/about/press/enterprise/2000/20000223_2.html.
Network Associates, Inc.; "McAfee GroupShield First to Offer Intelligent Virus Outbreak Management Technology for Lotus Notes and Domino Users", Aug. 15, 2000, Santa Clara, CA http://www.mcafee.com/us/about/press/enterprise/2000/20000815.html.
Network Associates, Inc "McAfee Outbreak manager Stops Email-Based Viruses Like Love Bug and NewLove Before Outbreaks Can Start", May 25, 2000, Santa Clara, CA, PRNewswire http://www.mcafee.com/us/about/press/enterprise/2000/20000525.html.
"Outbreak Manager" Retrieved from the Internet on Jun. 24, 2002 <URL:http://web.archive.org/web/20001019071658/http://www.mcafeeb2b.com/products/omanager/default-email-protection.asp> the whole document.
Garber L: "Melissa Virus Creates a New Type of Threat" Computer, IEEE Computer Society, Long Beach, CA US, US, vol. 32, No. 6, Jun. 1999, pp. 16-19, XP000829612, ISSN: 0018-9162 p. 16, right-hand col., line 37-line 46 p. 19, right-hand col., line 10-line 15.
Howlett D: "Screening your E-Mail Contents" PC User, London, GB, No. 266, Sep. 6, 1995, p. 58 XP000617461 the whole document.

* cited by examiner

METHOD OF AND SYSTEM FOR, PROCESSING EMAIL

The present invention relates to a method of, and system for, processing email in particular to detect virus outbreaks. The invention is particularly, but not exclusively, applicable to processing of email by ISPs (Internet Service Providers).

BACKGROUND OF THE INVENTION

It should be noted that some discussions of malicious software use the term "virus" in a narrow sense as relating to software having particular characteristics in terms of propagation, possibly also multiplication, and effect which are distinct from other forms such as "trojan horses", "worms", etc. However, in this specification, including the appended claims, the term virus is used in the general sense of any software which by malice (or accident) causes undesired effects.

Conventional virus checkers find viruses by looking for known patterns in files, by checking for new or changed files in a file system or by running suspicious programs in a sandbox emulator environment to detect virus-like activity.

The increasing use of email, over both the Internet and private networks, increases the exposure of individual end users and operations to malicious disruption. Recently there have been email-borne virus outbreaks which have spread across the world in a matter of hours. Some degree of protection can be achieved by scanning emails and their attachments for viruses and obviously this is best done on a centralised basis, e.g. by ISPs and others who operate email gateways, rather than leaving it to end users who may or may not have the resources, knowledge or inclination to take their own anti-virus measures.

However, even with centralised scanning there is still a problem with new viruses. Leaving aside the question of how a new virus is first detected, whether by measures taken by an ISP or similar, or at an end user's machine, the steps necessary to mitigate the effect of an outbreak of it take time to put into effect, and by the time that they have been, the worst effects of the outbreak may already have occurred, all across the world. These steps typically include identifying a characteristic string of bytes or other "signature" which identifies the virus, disseminating this information to virus-scanning sites, and programming the scanners with this information, all of which takes time, and meanwhile the outbreak is free to spread.

This has become particularly problematic recently with the type of virus which can effectively multiply itself by generating and sending copies of the email which contains it, e.g. by accessing an email address book (e.g. that available to an end user's email client) and then using services available on the machine to send a copy of the email and itself to any or all of the addresses found. This tactic can propagate between continents in a matter of minutes and result in a geometric "explosion" of the number of instances of it.

OBJECT OF THE INVENTION

The present invention seeks to reduce the problem of dealing with new viruses borne by email.

SUMMARY OF THE INVENTION

The invention provides a method of processing email to detect the spread of previously unknown viruses which comprises monitoring email traffic passing through one or more nodes of a network for patterns of email traffic which are indicative of, or suggestive of, the spread of an email-borne virus and, once such a pattern is detected, initiating automatic remedial action, alerting an operator, or both.

The invention also provides a system for processing email to detect the spread of previously unknown viruses which comprises monitoring email traffic passing through one or more nodes of a network for patterns of email traffic which are indicative of, or suggestive of, the spread of an email-borne virus and, once such a pattern is detected, initiating automatic remedial action, alerting an operator, or both.

Thus, rather than monitoring individual emails, the invention treats emails being processed as an "ensemble" and looks for patterns in the traffic of email which are characteristic of viruses being propagated via email. It has been found that such characteristic patterns are relatively easy to define, and to identify once they occur.

To assist in the identification of relevant patterns of email traffic, each email is analysed by reference to a number of criteria which indicate that the email may contain a virus. Any email which meets any of these criteria may then be logged to a database. Examination of recent additions to this database can then be used to identify traffic patterns indicative or suggestive of a virus outbreak.

The decision whether or not to log a particular email can be taken on the basis of whether it meets one or more criteria indicating that it is possible for the email to contain a virus. In other words, the criteria chosen to decide whether to log an email can be ones which indicate that it is possible for the email to contain a virus, regardless of whether it actually does, on the basis that emails which cannot possibly contain a virus need not be individually logged. However, the invention does not exclude the possibility that one or more criteria seek to determine whether an email actually does contain a virus, by any suitable scanning, or other analytical, technique.

Suppose a user reports that a particular email contained a virus as an attachment, and that this is one of a number of emails that has been recently processed by the system. The database will have in it entries recording items such as the sender and recipient, email subject, attachment names and sizes. It is possible, automatically (i.e. in software) or with human intervention to identify the relevant stored attributes of these messages and use them as the basis for taking the corrective action in relation to subsequently processed, matching, emails. It is also possible to notify recipients of matching emails which have already been processed to take corrective action of their own, e.g. to delete the email unread and unopened, assuming the system stores the recipient name in plaintext.

DESCRIPTION OF THE DRAWINGS

The invention will be further described by way of non-limitative example with reference to the accompanying drawings, in which:—

ILLUSTRATED EMBODIMENT

Figure 1:
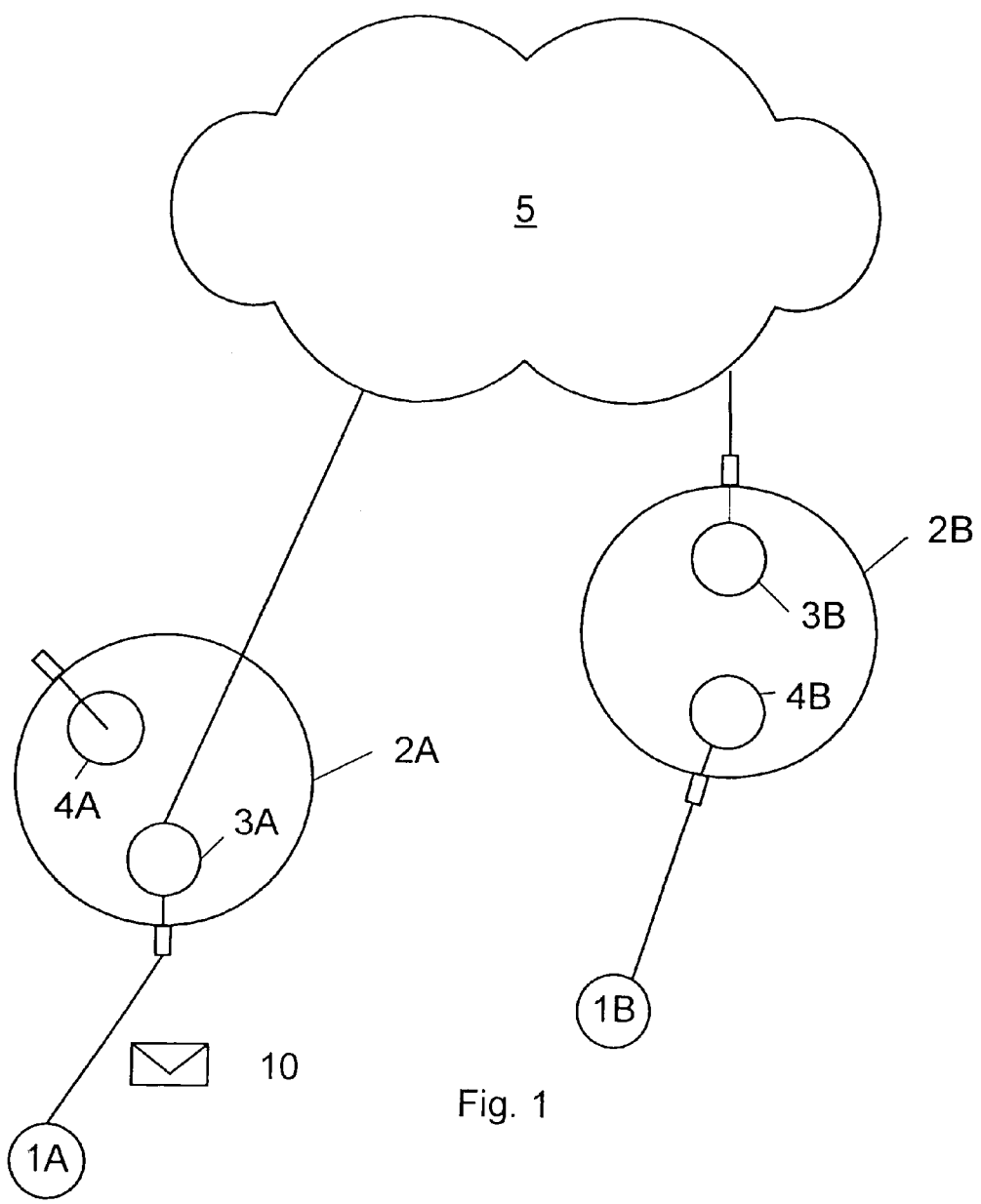
FIG. 1 illustrates the process of sending an email over the Internet.

Before describing the illustrated embodiment of the invention, a typical process of sending an email over the Internet will briefly be described with reference to FIG. 1. This is purely for illustration; there are several methods for delivering and receiving email on the Internet, including, but not limited to: end-to-end SMTP, IMAP4 and UCCP. There are also other ways of achieving SMTP to POP3 email, including for instance, using an ISDN or leased line connection instead of a dial-up modem connection.

Suppose a user 1A with an email ID "asender" has his account at "asource.com" wishes to send an email to someone 1B with an account "arecipient" at "adestination.com", and that these .com domains are maintained by respective ISPs (Internet Service Providers). Each of the domains has a mail server 2A,2B which includes one or more SMTP servers 3A,3B for outbound messages and one or more POP3 servers 4A,4B for inbound ones. These domains form part of the Internet which for clarity is indicated separately at 5. The process proceeds as follows:

1. Asender prepares the email message using email client software 1A such as Microsoft Outlook Express and addresses it to "arecipient@adestination.com".

2. Using a dial-up modem connection or similar, asender's email client 1A connects to the email server 2A at "mail.asource.com".

3. Asender's email client 1A conducts a conversation with the SMTP server 3A, in the course of which it tells the SMTP server 3A the addresses of the sender and recipient and sends it the body of the message (including any attachments) thus transferring the email 10 to the server 3A.

4. The SMTP server 3A parses the TO field of the email envelope into a) the recipient and b) the recipient's domain name. It is assumed for the present purposes that the sender's and recipients' ISPs are different, otherwise the SMTP server 3A could simply route the email through to its associated POP3 server(s) 4A for subsequent collection.

5. The SMTP server 3A locates an Internet Domain Name server and obtains an IP address for the destination domain's mail server.

6. The SMTP server 3A connects to the SMTP server 3B at "adestination.com" via SMTP and sends it the sender and recipient addresses and message body similarly to Step 3.

7. The SMTP server 3B recognises that the domain name refers to itself, and passes the message to "adestination"'s POP3 server 4B, which puts the message in "arecipient"'s mailbox for collection by the recipients email client 1B.

There are various ways in which email can be used to malicious effect, probably the most widely known being a virus which travels with the email as an attachment. Typically, the recipient "opening" the attachment, as by double-clicking it, allows the virus which may be a binary executable or scripting code written to an interpreter hosted by the email client or the operating system, to execute. Neither the problem of malicious intent, nor the present invention's solution to it, is restricted to viruses of this type. For example other malicious attacks may involve exploiting weaknesses of the delivery system (SMTP+POP3) or the email client, as by deliberately formatting an email header field in a way which is known to cause misoperation of software which processes it.

Figure 2:
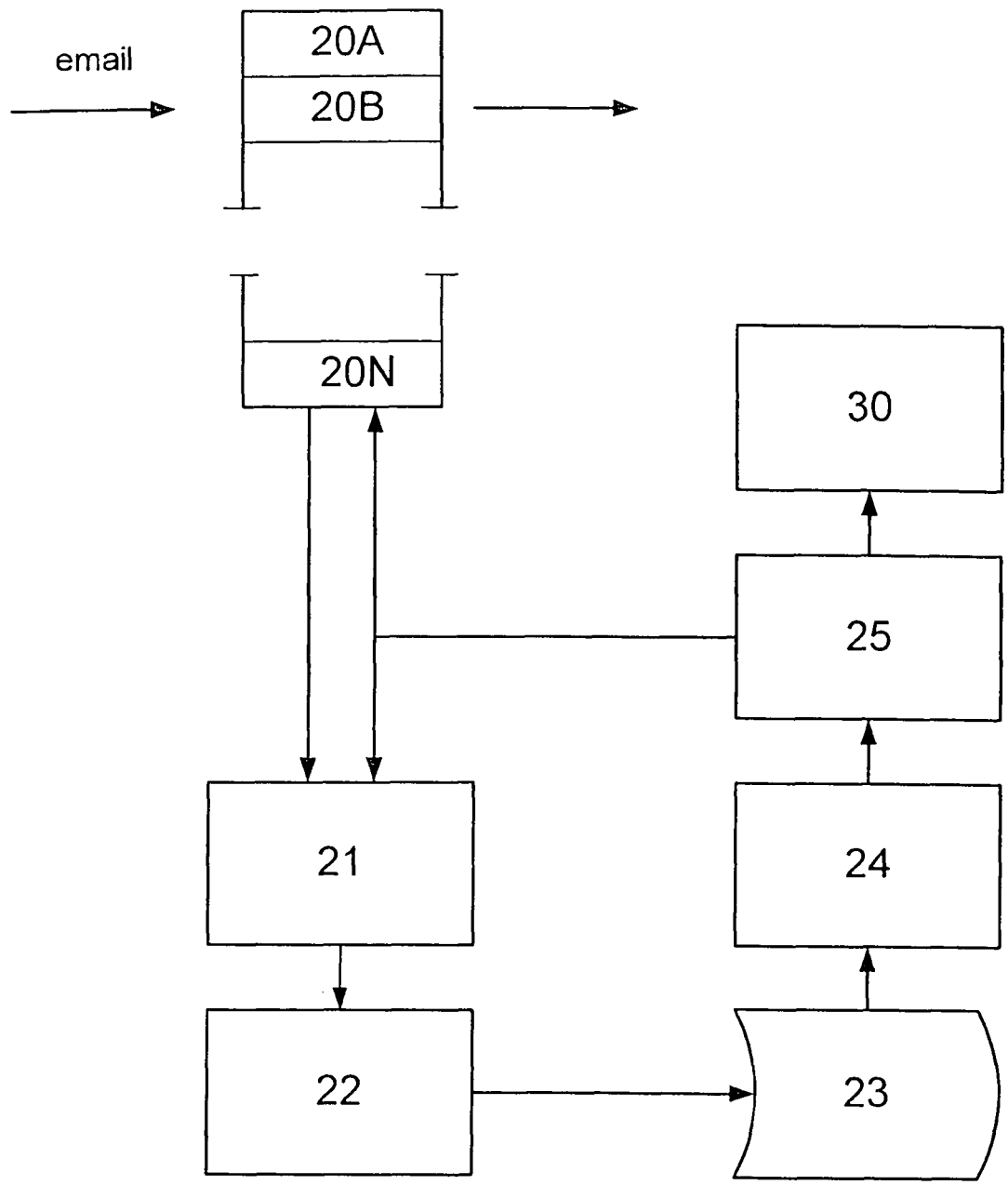
FIG. 2 is a block diagram of one embodiment of the invention.

Referring now to FIG. 2, this shows in block form the key sub-systems of an embodiment of the present invention. In the example under consideration, i.e. the processing of email by an ISP, these subsystems are implemented by software executing on the ISP's computer(s). These computers operate one or more email gateways 20A . . . 20N passing email messages such as 10.

The various subsystems of the embodiment will be described in more detail below but briefly comprise;

a message decomposer/analyser 21 which decomposes emails into their constituent parts and analyses them to assess whether they are candidates for logging;

a logger 22 which prepares a database entry for each message selected as a logging candidate by the decomposer/analyser 21;

a database 23 which stores the entries prepared by logger 22;

a searcher 24 which scans new entries in the database 23 looking for signs of virus-bearing traffic;

a stopper 25 which signals the results from the searcher 24 and optionally stops the passage of emails which conform to criteria of the decomposer/analyser 21 as indicating a virus threat.

The stopper 25 can be implemented in such a way that emails which are processed by the system and are not considered to be infected with a virus can have a text notification inserted in them, e.g. appended to the message text, saying that the email has been scanned by the system, so that the recipient will be able to see that it has.

Overall, the system of FIG. 2 works on the following principles.

Viruses that spread by email can be detected by examining the traffic patterns of the emails they create.

The illustrated embodiment applies a set of heuristics to identify email viruses. The following is a non-exhaustive list of criteria by which emails may be assessed to implement these heuristics. Other criteria may be used as well or instead:—

They contain the same or similar subject lines;
They contain the same or similar body texts;
They contain the same named attachment;
They contain an attachment with the same message digest;
They are addressed to many recipients;
They are addressed to recipients in alphabetical, or reverse alphabetical order;
They are sent to a particular email address, and then exit multiply from the same email address, and/or similar:email addresses;
They contain the same structural format;
They contain the same structural quirks;
They contain the same unusual message headers.

The above criteria should be self-explanatory, except possibly those which refer to "message digest" and "structural quirks"; those expressions are explained below.

Each of the above criteria is assigned a numerical score. Each email that passes through the system is analysed by the decomposer/analyser 21, and logged in a database 23 by logger 22. A search routine executed by searcher 24 continually analyses the new information being stored in the database to see if similar messages are being sent. If they are, then the 'suspiciousness' of the email is calculated using an algorithm which takes into account how similar the messages are, and also how many of them have been received recently. Once a threshold has been passed, all new messages that match the criteria are stopped as potential viruses by stopper 25, and an alarm is raised.

The system may generate a message digest, at least for those messages which are logged in the database. Message digests are a convenient and efficient means of identifying messages with the same message text and as a "handle" by which to retrieve a collection of log entries which represent the same message text being sent in multiple emails. The digest may be stored in the database in addition to, or instead of, the message list.

A message digest is typically created by applying a one way hashing algorithm (such as MD5 or Message-Digest-5) to a series of characters (in the present case, for example, the characters of a message). The advantages of using a digest in this application are:

They are typically smaller than the original message, and are of fixed length, so they can be stored in a database more easily;

They are typically one-way functions, so the original message cannot be recreated, thus preserving customer confidentiality;

A small change in the message will result in a completely different digest.

For instance, the MD5 digest of "The rain in spain falls mainly on the plain" is 6f7f4c35a219625efc5a9ebad8fa8527 and of "The rain in Spain falls mainly on the plain" is b417b67704f2dd2b5a812f99ade30e00. These two messages differ only by one bit (the 's' is Spain, since a capital S is one bit different to a lowercase s in the ASCII character set), but the digests are totally different.

Some examples of the criteria by which emails may be assessed will now be given:

Structural quirks: Most emails are generated by tried and tested applications. These applications will always generate email in a particular way. It is often possible to identify which application generated a particular email by examining the email headers and also be examining the format of the different parts. It is then possible to identify emails which contain quirks which either indicate that the email is attempting to look as if it was generated by a known emailer, but was not, or that it was generated by a new and unknown mailer, or by an application (which could be a virus or worm). All are suspicious.

EXAMPLES

Inconsistent Capitalisation
  from: alex@star.co.uk
  To: alex@star.co.uk

The from and to have different capitalisation

Non-standard Ordering of Header Elements
  Subject: Tower fault tolerance
  Content-type: multipart/mixed; boundary="=====_962609498==_"
  Mime-Version: 1.0

The Mime-Version header normally comes before the Content-Type header.

Missing or Additional Header Elements
  X-Mailer: QUALCOMM Windows Eudora Pro Version 3.0.5 (32)
  Date: Mon, 3 Jul. 2000 12:24:17 +0100

Eudora normally also includes an X-Sender header

Message ID Format
  Message-ID: <00270ibfe4elSb37dbdc0S9264010a@tomkins.int.star.co.uk>
  X-Mailer: QUALCOMM Windows Eudora Pro Version 3.0.5 (32)

The X-mailer header says the mail is generated by Eudora, but the message-id format is an Outlook message-id, not a Eudora message-id.

Boundary Format
  X-Mailer: Microsoft Outlook 8.5, Build 4.71.2173.0
  Content-Type: multipart/mixed; boundary="=====_962609498==_"

The X-mailer header says the mail is generated by Outlook, but the boundary format is a Eudora boundary, not an Outlook boundary.

Line Break and Other White Space Composition in Message Header
  To: "Andrew Webley" <awebley@messagelabs.com>,
  "Matt Cave" <MCave@messagelabs.com>,
  "Alex at MessageLabs" ashipp@messagelabs.com
  X-Mailer: QUALCOMM Windows Eudora Pro Version 3.0.5 (32)

The e-mailer (Eudora) normally uses a single space, and no tabs for continuation lines.

It Originates from Particular IP Addresses or IP Address Ranges.

The IP address of the originator is, of course, known and hence can be used to determine whether this criterion is met.

It Contains Specialised Constructs

Some email uses HTML script to encrypt the message content. This is intended to defeat linguistic analysers. When the mail is viewed in a mail client such as Outlook, the text is immediately decrypted and displayed. It would be unusual for a normal email to do this.

Empty Message Sender Envelopes

An email normally indicates the originator in the Sender text field and spam originators will often put a bogus entry in that field to disguise the fact that the email is infected. However, the Sender identity is also supposed to be specified in the protocol under which SMTP processes talk to one another in the transfer of email, and this criterion is concerned with the absence of the sender identification from the relevant protocol slot, namely the Mail From protocol slot.

Invalid Message Sender email Addresses

This is complementary to item 8 and involves consideration of both the sender field of the message and the sender protocol slot, as to whether it is invalid. The email may come from a domain which does not exist or does not follow the normal rules for the domain. For instance, a HotMail address of "123@hotmail.com" is invalid because HotMail addresses cannot be all numbers.

A number of fields of the email may be examined for invalid entries, including "Sender", "From", and "Errors-to".

Message Sender Addresses which do not Match the Mail Server from which the Mail is Sent.

The local mail server knows, or at least can find out from the protocol, the address of the mail sender, and so a determination can be made of whether this matches the sender address in the mail text.

In an actual implementation of the system of FIG. 2 a network of email gateways 20 is preferred, so that email can be processed on the required scale. The more widespread this network, and the more email processed, then the greater the chances of being able to intercept new viruses, recognise the symptoms, and stop further occurrences before the virus becomes too widespread. However, use of a number of email gateways is not an essential component of the system; the system is able to recognise and detect new viruses even if only one email gateway is used, and if even a small amount of email passes through it.

All email is passed through the analyser/decomposer 21 in which email is broken into its constituent parts. For the purposes of traffic heuristics, each part is classified as:

The email header/mime headers;
  A component normally considered part of the message;
  A component normally considered as an attachment.

Each part is then further analysed to see if it has the possibility of containing potential threats.

Email header/mime headers: Overlong lines, or lines with unusual syntax may be used to crash particular browsers, causing either a denial of service attack or an exploit which can cause a security breach or spread a virus.

A component normally considered part of the message: These may contain embedded executable code. For instance, an HTML message may contain scripting code in various computer languages, or it may contain elements (such as <frameset> or <object> tags) which have been shown to be exploitable.

A component normally considered as an attachment: These may be directly executable, such as an EXE file. They may contain embedded executable code, such as a Microsoft Word document containing a macro. They may contain archive file or other container files, which themselves may contain other dangerous components. For instance, a ZIP file may contain an executable.

Normally, the attachment must contain some executable element to be viewed as a potential threat. However, the system is capable of being toggled into a mode where it views all attachments as a potential threat. This is to cater for two possibilities such as:

A document, such as a jpg picture, may contain illegal formatting that crashes the application used to view the attachment. This can cause either a denial of service attack, or an exploit which can cause a security breach or spread a virus.

The message body may contain instructions which, if followed, turn the attachment into a dangerous form, e.g. 'rename picture.jpg to picture.exe'.

After analysing each component, then if any one component has the possibility of containing a potential threat, the message is logged by the logger 22 in the database 23. Otherwise, the message is not logged.

The logger 22 is programmed so that the system logs components of each. message so that similar messages can be detected. The following are logged:

Subject line and digest of subject line;
First few characters of text part of email, digest of first text part, and digest of first few characters;
Name of first attachment;
Digest of first attachment;
Number of recipients;
Whether recipients are in alphabetical order, or reverse alphabetical order;
Time of logging;
Digest of sender;
Digest of first recipient;
Structural format indicators;
Structural quirk indicators;
Unusual message headers;
Time email arrived.

The above list is not exhaustive, and the invention is not restricted to this particular combination of information items.

The database 23 logs details about messages, and allows querying of the details to find patterns of duplicate or similar emails.

In order to provide responsiveness, logging may be a one tier or several tier operation. For instance, messages may be logged locally in a database geographically near to the email servers, and analysed locally. This gives a quick response to local traffic patterns. However, the logs may also be copied back to a central database to perform global analysis. This will be slower to react, but will be able to react on global, rather than local patterns.

Old log entries are automatically deleted from the database 23 since they are no longer needed—the system is designed to provide an early warning of new viruses.

The searcher 24 periodically queries the database searching for recent similar messages and generating a score by analysing the components. Depending on the score, the system may identify a 'definite' threat or a 'potential' threat. A definite threat causes a signature to be sent back to the stopper so that all future messages with that characteristic are stopped. A potential threat causes an alert to be sent to an operator who can then decide to treat as if it were a definite threat, to flag as a false alarm so no future occurrences are reported, or to wait and see.

The searcher can be configured with different parameters, so that it can be more sensitive if searching logs from a single email gateway, and less sensitive if processing a database of world-wide information.

Each criterion can be associated a different score.
The time between searches can be adjusted.
The time span each search covers can be adjusted and multiple time spans accommodated.
Overall thresholds can be set.

The stopper 25 takes signatures from the searcher 24. The signature identifies characteristics of emails which must be stopped. On receiving the signature, all future matching emails are treated as viruses, and stopped.

Obviously, the stopping action can take a number of forms, including

Disposing of the infected emails without sending them to their addressed recipients.

Holding them in temporary storage and notifying the addressee by email that an infected message has been intercepted and is being held for a period for their retrieval, should they wish, otherwise it will be deleted.

Disinfecting the email by removing the virus threat by any suitable means; for example if the virus is an executable attachment, it can be detached or disarmed before forwarding the email to its addressees. The email may be modified by the inclusion of a text message saying that the email has been disinfected.

Where a virus is detected, an automated mail server 30 may notify other sites of the relevant characteristics of the infected emails, either to alert human operators or to supply embodiments of the invention at remote sites with the characteristics of the emails necessary for their stoppers 25 to stop them.

Typical Algorithm

The following is one possible algorithm which can be implemented by the searcher 24 in an illustrated embodiment of the invention Referring to the example email-assessment criteria set out above, it will be appreciated that an email under consideration has a number of attributes which can be represented as data values in a computer program, with the data type depending on the nature of the attribute. For example, the length of the message and number of attachments are integers, whereas the various text headers (e.g. To, SendTo, Subject) are character strings, as are digests such as the message digest. In the following, emails are considered to be equal according to a given criterion if the corresponding attributes are equal in the cases of integers and character strings. In the case of character strings, where appropriate, equality can be determined by a case-insensitive comparison; case-insensitive comparisons are appropriate for the textual fields of an email, but not necessarily for other character strings. (In the case of an attribute represented by a floating point value, the skilled man will be aware that comparisons should be done on the basis of whether the absolute value of the difference is greater than some small arbitrary value, sometimes referred to as "epsilon" in the technical literature, which is itself greater than the rounding error).

Below, the numbers in brackets are step numbers to identify the steps carried out.

At regular intervals (100):
For each criterion A we are measuring (110)
    For each time interval B minutes we are measuring (200)
        Get sample set S of emails over last B minutes where their value according to a selected criterion A is equal (210). Partition the sample set if it contains values which cannot be the same virus (for instance, if some emails in the set contain a HTML script, and some contain an EXE these cannot be the same virus, and should each be treated as a separate set S per step 210)
        For each sample set S (300)
            Set X=count of mails in sample set (310)
            Multiply X from step 310 by an importance factor C for criterion A (320). Each criterion has a respective importance factor which depends on the nature of the criterion, since some criteria, e.g. the name of a file attachment may be more significant than others so far as assessing the likelihood of a virus threat is concerned; similar comments apply to the other factors mentioned below)
            Add to X from step 320 a second-importance factor D for each other criterion A2, where A2 is also equal over the sample set S (330)
            Add to X from step 330 a third importance factor E for each other criterion A3, where A3 has a limited set of different values over the sample set S (340). "Limited range" means >1 and <R. Each time interval B has a respective R.
            Add to X from step 340 a spread factor (P times T) if the sample set contains Q emails entering a domain, and then T copies leaving the domain (where T>Q) (350). Each time interval B has a different P and Q)
            If X from step 350 is greater than threshold V (each time interval B has a respective threshold V) then flag as virus. (360)
            Else
            If X from step 350 is greater than threshold O (each time interval B has a respective threshold O), where O is less than V, then flag as needing operator assistance (370). The operator can then assess whether a virus threat is present or not and instruct the software to proceed accordingly
        Next sample set (380)
    Next interval (210)
Next criterion (120)

Note that the three "importance" factors C, D, E, the spread factor and thresholds are numeric values which may be set empirically and may be adjusted dynamically. Also, the algorithm may be carried out using one or more different values for the time interval B, e.g. 5 minutes, 30 minutes and 180 minutes.

In English: we are looking for emails with similar characteristics arriving in a given time period. The more similar emails we find, the more suspicious we become. If the emails also have other characteristics in common, this makes us even more suspicious.

Some things may be more suspicious than others—for instance we may choose to allocate a higher score if we see emails with the same named attachment, than if we see emails with the same subject line.

If we see emails being sent to one domain, and then come flooding out, this is also suspicious.

Although, in the above, the invention has been described by reference to its application to Internet email, it is not restricted to such email; the invention is equally applicable to other private or public, local- or wide-area network or combinations of such networks with one another and with the Internet, as well as to email over WAP (Wireless Access Protocol) and SMS (Simple Messaging Service) for mobile telephones and similar devices.

The invention claimed is:

1. A system for processing email to detect the spread of previously unknown viruses which comprises:
    a computing system programmed for:
    monitoring email traffic passing through one or more nodes of a network, this monitoring comprising:
    analyzing emails to determine if they meet one or more predefined criteria, the predefined criteria indicating whether it is possible that a given email contains a virus, the predefined criteria including at least one of the given email having an attachment that is executable by the computing system, the given email having an executable attachment that is wrapped in a container, the given email containing an attachment having illegal formatting;
    logging details about emails that meet one or more of the predefined criteria to a local database, the details at least including at least two of the message digest of the subject of each logged email, a message digest of the message of each logged email if such a message was included with the email, a message digest of an attachment to the email if such an attachment was included with the email, and a message digest of the sender of each logged email, and the number of intended recipients of the email;
    assigning a suspiciousness score to each of the emails within the database that thus meet one or more of the predefined criteria, the suspiciousness score for each email relating to a degree of suspiciousness of a particular email according to one or more suspiciousness criteria the particular email meets, the suspiciousness criteria being different than the predefined criteria, the suspiciousness score being calculated using an algorithm which takes into account how similar the emails are to other emails in the database, and how many such similar emails have been received during a predefined length of time of 180 minutes or less, the suspiciousness score increasing as the number of similar emails received increases over the predefined length of time;
    searching the local database for patterns of recent email traffic which are indicative of, or suggestive of, the spread of a previously unknown email-borne virus, by applying a predetermined set of pattern criteria to attributes of the recent email traffic, the set of pattern criteria including criteria which relate to a plurality of constituent parts of recently arrived emails making up at least a portion of the recent email traffic, the recently arrived emails being emails that have arrived during the predefined length of time;
    detecting the suspected presence of a previously unknown email virus based on a detected pattern of email traffic which is indicative of, or suggestive of, the spread of a previously unknown email-borne virus; and,
    initiating, once such a pattern is detected which meets predefined threshold criteria, a remedial action, wherein the remedial action is selected from among an automatic remedial action, alerting an operator and both an automatic remedial action and alerting an operator, the remedial action being at least partly determined by the degree of suspiciousness associated with the detected pattern of email traffic.

2. The system of claim 1, wherein the remedial action is selected from among:
   a) at least temporarily stopping the passage of the emails
   b) notifying the sender
   c) notifying the intended recipient(s)
   d) disinfecting the email
   e) generating a signal to alert a human operator.

3. The system of claim 1 and including sending a message identifying suspect emails to an automated email server.

4. The system of claim 1 and including processing infected emails to disinfect them or to disarm a virus therein.

5. The system of claim 1 and including inserting in emails not taken to be virus infected, a message indicating that the email has been processed.

6. The system of claim 1, further comprising:
   while searching the database for patterns of email traffic which are indicative of, or suggestive of, the spread of a previously unknown email-borne virus applying different numerical weights to different suspiciousness criteria.

7. The system of claim 1, wherein, in the applying of the predetermined set of suspiciousness criteria, a set of emails is assigned a numerical score calculated according to a selected combination of said criteria and is detected as being a said pattern of email traffic if the score exceeds a predetermined threshold.

8. The system of claim 1, wherein logging details about emails includes logging of a digest of any one or more of:
   the message text;
   the subject line;
   the first few characters of the text part of the email;
   the first text part of the email;
   the first attachment;
   the sender; or
   the first recipient.

9. The system of claim 1, wherein said criteria include any one or more of:
   a criterion that an email contains inconsistent capitalization;
   a criterion that an email has line break or other white space composition in message headers inconsistent with the indicated generator of the email;
   a criterion that an email has non-standard ordering of header elements;
   a criterion that an email has missing or additional header elements;
   a criterion that an email has inconsistent message ID information;
   a criterion that an email has a boundary format inconsistent with the indicated generator of the email;
   a criterion that the message part of an email is encrypted to defeat linguistic analysis;
   a criterion that an email has an empty message sender envelope;
   a criterion that an email has an invalid message sender address;
   a criterion that an email has a message sender address which does not match the mail server from which it was sent;
   a criterion that emails are addressed to recipients in alphabetical, or reverse alphabetical, order;
   a criterion that emails are sent to a particular email address and then exit multiply from the same email address and/or similar email addresses;
   a criterion that emails contain the same structural format;
   a criterion that emails contain the same unusual headers;
   a criterion that emails contain the same structural quirk; or
   a criterion that an email originates from a particular IP address or an address in a range of IP addresses.

10. The system of claim 1, wherein the suspiciousness criteria are selected from among: length of message, number of attachments, sender IP address, and digest of first attachment.

11. The system of claim 1, wherein constituent parts of the emails are selected from among: the subject line, recipients, message text and attachments.

12. A computer-implemented system, in or for a computer network over which users send one another emails, for processing email to detect the spread of previously unknown viruses which comprises:
   a means for monitoring email traffic passing through one or more nodes of the network, wherein the means comprises:
   a means for analyzing emails to determine if they meet one or more predefined criteria, the predefined criteria indicating whether it is possible that a given email contains a virus, the predefined criteria including at least one of the given email having an attachment that is executable by the computing system, the given email having an executable attachment that is wrapped in a container, the given email containing an attachment having illegal formatting;
   a means for logging details about emails that meet one or more of the predefined criteria to a local database, the details at least including at least two of the message digest of the subject of each logged email, a message digest of the message of each logged email if such a message was included with the email, a message digest of an attachment to the email if such an attachment was included with the email, and a message digest of the sender of each logged email, and the number of intended recipients of the email;
   a means for assigning a suspiciousness score to each of the emails within the database that thus meet one or more of the predefined criteria, the suspiciousness score for each email relating to a degree of suspiciousness of a particular email according to one or more suspiciousness criteria the particular email meets, the suspiciousness criteria being different than the predefined criteria, the suspiciousness score being calculated using an algorithm which takes into account how similar the emails are to other emails in the database, and how many such similar emails have been received during a predefined length of time of 180 minutes or less, the suspiciousness score increasing as the number of similar emails received increases over the predefined length of time;
   a means for searching the local database for patterns of recent email traffic which are indicative of, or suggestive of, the spread of a previously unknown email-borne virus, by applying a predetermined set of pattern criteria to attributes of the recent email traffic, the set of pattern criteria including criteria which relate to a plurality of constituent parts of recently arrived emails making up at least a portion of the recent email traffic, the recently arrived emails being emails that have arrived during the predefined length of time;
   a means for detecting the suspected presence of a previously unknown email virus based on a detected pattern of email traffic which is indicative of, or suggestive of, the spread of a previously unknown email-borne virus; and
   a means for initiating, operative once such a pattern is detected which meets predefined threshold criteria, a remedial action, wherein the remedial action is selected from among an automatic remedial action, alerting an operator and both an automatic remedial action and alerting an operator, the remedial action being at least partly determined by the degree of suspiciousness associated with the detected pattern of email traffic.

13. The computer-implemented system according to Ccaim 12, wherein the means for initiating is operative such that the remedial action includes any or all of the following, in relation to each email which conforms to the detected pattern:
 a) at least temporarily stopping the passage of the emails;
 b) notifying the sender;
 c) notifying the intended recipient(s);
 d) disinfecting the email; and
 e) generating a signal to alert a human operator.

14. The computer-implemented system according to claim 12 and including means for sending a message identifying suspect emails to an automated email server.

15. The computer-implemented system according to claim 12 and including means for processing infected emails to disinfect them or to disarm a virus therein.

16. The computer-implemented system according to claim 12 and including means for inserting in emails not taken to be virus infected, a message indicating that the email has been processed.

17. The computer-implemented system according to claim 12, wherein the means for searching the database for patterns of email traffic which are indicative of, or suggestive of, the spread of a previously unknown email-borne virus is operative to apply different numerical weights to different suspiciousness criteria.

18. The computer-implemented system according to claim 12, wherein, the means for searching the database for patterns of email traffic which are indicative of, or suggestive of, the spread of a previously unknown email-borne virus is operative, in the applying of the predetermined set of suspiciousness criteria, to assign a set of emails a numerical score calculated according to a selected combination of said criteria, and to detect the set of emails as a said pattern of email traffic when the score exceeds a predetermined threshold.

19. The computer-implemented system according to claim 12, wherein the means for logging details about emails to a database is operative to log details about emails including a digest of any one or more of:
 the message text;
 the subject line;
 the first few characters of the text part of the email;
 the first text part of the email;
 the first attachment;
 the sender; or
 the first recipient.

20. The computer-implemented system according to claim 12, wherein said criteria include any one or more of:
 a criterion that an email contains inconsistent capitalization;
 a criterion that an email has line break or other white space composition in message headers inconsistent with the indicated generator of the email;
 a criterion that an email has non-standard ordering of header elements;
 a criterion that an email has missing or additional header elements;
 a criterion that an email has inconsistent message ID information;
 a criterion that an email has a boundary format inconsistent with the indicated generator of the email;
 a criterion that the message part of an email is encrypted to defeat linguistic analysis;
 a criterion that an email has an empty message sender envelope;
 a criterion that an email has an invalid message sender address;
 a criterion that an email has a message sender address which does not match the mail server from which it was sent;
 a criterion that emails are addressed to recipients in alphabetical, or reverse alphabetical, order;
 a criterion that emails are sent to a particular email address and then exit multiply from the same email address and/or similar email addresses;
 a criterion that emails contain the same structural format;
 a criterion that emails contain the same unusual headers;
 a criterion that emails contain the same structural quirk; or
 a criterion that an email originates from a particular IP address or an address in a range of IP addresses.

21. The computer-implemented system according to claim 12, wherein the suspiciousness criteria are selected from among: length of message, number of attachments, sender IP address, and digest of first attachment.

22. The computer-implemented system according to claim 12, wherein constituent parts of the emails are selected from among: the subject line, recipients, message text and attachments.

* * * * *